(12) United States Patent
Auger et al.

(10) Patent No.: US 7,687,736 B2
(45) Date of Patent: Mar. 30, 2010

(54) TENSIONED TOUCH PANEL AND METHOD OF MAKING SAME

(75) Inventors: Paul Anthony Auger, Osgoode (CA); Amir Butmir, Kanata (CA)

(73) Assignee: SMART Technologies ULC (CA)

( * ) Notice: Subject to any disclaimer, the term of this patent is extended or adjusted under 35 U.S.C. 154(b) by 1180 days.

(21) Appl. No.: 10/834,361

(22) Filed: Apr. 29, 2004

(65) Prior Publication Data

US 2005/0241929 A1    Nov. 3, 2005

(51) Int. Cl.
*H03K 17/975*    (2006.01)
(52) U.S. Cl. .................. 200/600; 200/511; 345/173; 341/22
(58) Field of Classification Search ............. 200/600, 200/511, 512, 329; 345/102, 173, 174, 175; 341/22, 32
See application file for complete search history.

(56) References Cited

U.S. PATENT DOCUMENTS

| | | | | |
|---|---|---|---|---|
| 4,856,993 A | * | 8/1989 | Maness et al. | 433/68 |
| 4,958,148 A | * | 9/1990 | Olson | 345/174 |
| 5,811,784 A | * | 9/1998 | Tausch et al. | 235/472.01 |
| 5,838,309 A | | 11/1998 | Robsky et al. | |
| 6,356,259 B1 | * | 3/2002 | Maeda et al. | 345/173 |
| 6,452,479 B1 | * | 9/2002 | Sandbach | 338/208 |
| 6,664,950 B1 | | 12/2003 | Blanchard | |
| 2001/0051275 A1 | | 12/2001 | Muraoka | |
| 2002/0101409 A1 | * | 8/2002 | Yokoyama et al. | 345/173 |
| 2006/0003210 A1 | * | 1/2006 | Ofer et al. | 429/30 |

FOREIGN PATENT DOCUMENTS

| | | |
|---|---|---|
| CA | 2 391 745 A1 | 12/2003 |
| EP | 1 058 205 A1 | 12/2000 |
| EP | 1 067 454 A1 | 1/2001 |
| EP | 1 081 633 A2 | 3/2001 |
| EP | 1 058 205 B1 | 1/2003 |

* cited by examiner

*Primary Examiner*—Kyung Lee
(74) *Attorney, Agent, or Firm*—Katten Muchin Rosenman LLP

(57) ABSTRACT

A tensioned touch panel includes a support structure having a substrate with a generally planer conductive surface disposed thereon and an insulating spacer generally about the periphery of the substrate. A pretensioned conductive member overlies the support structure. The spacer separates the conductive membrane and the conductive surface thereby to define an air gap therebetween. A conductive membrane is secured to the support structure under sufficient tension to inhibit slack from developing in the conductive membrane as a result of changes in environmental conditions. A method of assembling a tensioned touch panel is also provided.

31 Claims, 6 Drawing Sheets

TENSIONED TOUCH PANEL AND METHOD OF MAKING SAME

FIELD OF THE INVENTION

The present invention relates generally to touch systems and in particular to a tensioned touch panel and method of making the same

BACKGROUND OF THE INVENTION

Touch panels such as for example digitizers and analog resistive touch screens that make use of one or more tensioned membranes, are known in the art. Tensioned touch panels of this nature typically include a conductive membrane that is stretched tautly over and spaced from a conductive substrate. When a pointer is used to contact the tensioned membrane with sufficient activation force, the tensioned membrane deflects and contacts the conductive substrate thereby to make an electrical contact. Determining voltage changes induced by the electrical contact allows the position of pointer contact on the tensioned touch panel to be determined.

In order for such tensioned touch panels to work effectively, the spacing between the tensioned membrane and the conductive substrate must be maintained so that the tensioned membrane only contacts the conductive substrate when a pointer contact is made on the tensioned membrane.

As will be appreciated, over time the tensioned membrane may sag creating slack in the tensioned membrane. Changes in environmental conditions such as humidity and/or temperature may also cause the tensioned membrane to expand resulting in slack developing in the tensioned membrane. If the tensioned membrane sags or expands, the slack developed in the tensioned membrane may result in undesirable contact between the tensioned membrane and the conductive substrate. This problem becomes more severe as the size of the touch panel becomes greater.

A number of techniques have been considered to avoid undesirable contact between the tensioned membrane and the conductive substrate. For example, electrically insulating spacer dots may be disposed between the tensioned membrane and the conductive substrate at spaced locations over the active contact area of the touch panel to maintain the spacing between the tensioned membrane and the conductive substrate. U.S. Pat. No. 5,220,136 to Kent discloses a contact touchscreen including such insulating spacer dots.

Although the use of insulating spacer dots maintains separation between the tensioned membrane and the conductive substrate, the use of insulating spacer dots is problematic. In order to maintain separation between the tensioned membrane and the conductive substrate over the active contact area of the touch panel, the insulating spacer dots must be positioned at locations within the active contact area. Thus, the insulating spacer dots interrupt the active contact area of the touch panel. As a result, contacts with the tensioned membrane over insulating spacer dots will not register as contacts since the tensioned membrane cannot be brought into electrical contact with the conductive substrate at those contact points. Also, the use of insulating spacer dots to separate the tensioned membrane and the conductive substrate is expensive. It is also difficult to maintain an even spacing between the tensioned membrane and the conductive substrate over the active contact area using insulating spacer dots.

U.S. Pat. No. 5,838,309 to Robsky et al. discloses a self-tensioning membrane touch screen that avoids the need for insulating spacer dots. The touch screen includes a support structure having a base and a substrate support on which a conductive surface is disposed. A peripheral insulating rail surrounds the conductive surface. A peripheral flexible wall extends upwardly from the base. A conductive membrane is stretched over the conductive surface and is attached to the peripheral flexible wall. The insulating rail acts to space the conductive membrane from the conductive surface. To inhibit sagging and maintain tension on the conductive membrane, during assembly of the touch screen the conductive membrane is attached to the flexible wall when the flexible wall is in a pretensioned state. In the assembled condition, the flexible wall is biased outwardly and downwardly. As a result, tension is continuously applied to the conductive membrane by the flexible wall thereby to inhibit sagging of the conductive membrane.

U.S. Pat. No. 6,664,950 to Blanchard discloses a resistive touch panel having a removable, tensioned top layer and a base plate. The touch panel may be situated relative to a display screen such that an air gap exists between the base plate and the display screen. The top plate includes a transparent, flexible substrate having a hard transparent coating, one or more anti-reflective coatings and an anti-fingerprint coating thereon. The underside of the substrate is spaced from the upper surface of the base plate by an air gap. To prevent wrinkling of the top plate, a stiff frame is bonded to the anti-fingerprint coating. The stiff frame maintains tension in the top plate despite temperature changes.

Although the above references show touch panels having mechanisms to maintain tension in the conductive membrane, manufacturing and labour costs are associated with these tensioning mechanisms. Accordingly, improvements in tensioned touch panels to maintain the spacing between the tensioned membrane and the conductive substrate are desired.

It is therefore an object of the present invention to provide a novel tensioned touch panel and method of making the same.

SUMMARY OF THE INVENTION

According to one aspect of the present invention there is provided a method of assembling a touch panel including a support structure and a conductive membrane. The support structure has a conductive surface and a peripheral insulating spacer about the conductive surface. The conductive membrane overlies the support structure with the spacer separating the conductive membrane and the conductive surface thereby to define an air gap therebetween. During the method, the conductive membrane is pretensioned and the tensioned conductive membrane is secured to the support structure.

The pretensioning in one embodiment is selected to compensate for both the coefficients of thermal expansion and hydroscopic or hygroscopic expansion of the conductive membrane over a variety of temperature and humidity conditions. The stress level is selected to be below the yield point of the conductive membrane and at a level below which the conductive membrane exhibits significant creep i.e. creep where the tension in the conductive membrane drops over time to a level resulting in an unacceptable decrease in activation force and/or unwanted contact between the conductive membrane and the conductive surface. The conductive membrane is bonded to the support structure via an adhesive such as for example an ultraviolet curing or cyanoacrylate (CA) adhesive.

The support structure includes a generally planar surface on which the conductive surface is disposed. The spacer is generally continuous and overlies the peripheral region of the planar surface thereby to surround the conductive surface.

The conductive membrane may be adhered directly to the spacer or pulled around the spacer and adhered to the support structure.

According to another aspect of the present invention there is provided a tensioned touch panel comprising a support structure including a substrate having a generally planar conductive surface disposed thereon and an insulating spacer generally about the periphery of the substrate. A pretensioned conductive membrane overlies the support structure. The spacer separates the conductive membrane and the conductive surface thereby to define an air gap therebetween. The conductive membrane is secured to the support structure under sufficient tension to inhibit slack from developing in the conductive membrane as a result of changes in environmental conditions.

According to yet another aspect of the present invention there is provided a tensioned touch panel comprising a support structure having a conductive surface disposed thereon. A conductive membrane overlies the conductive surface in spaced apart relation. The conductive membrane is permanently secured to the substrate while under tension.

The present invention provides advantages in that an overall uniform tension can be maintained in the conductive membrane while reducing manufacturing and labour costs of the tensioned touch panel. As a result, slack is inhibited from developing in the conductive membrane regardless of environmental conditions while maintaining activation forces at user acceptable levels.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
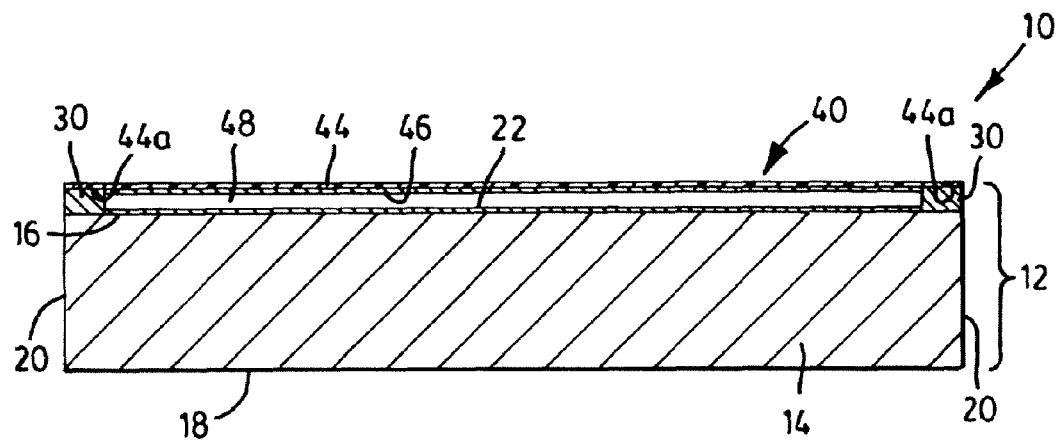
FIG. 1 is a side cross-sectional view of a tensioned touch panel.
Figure 2:
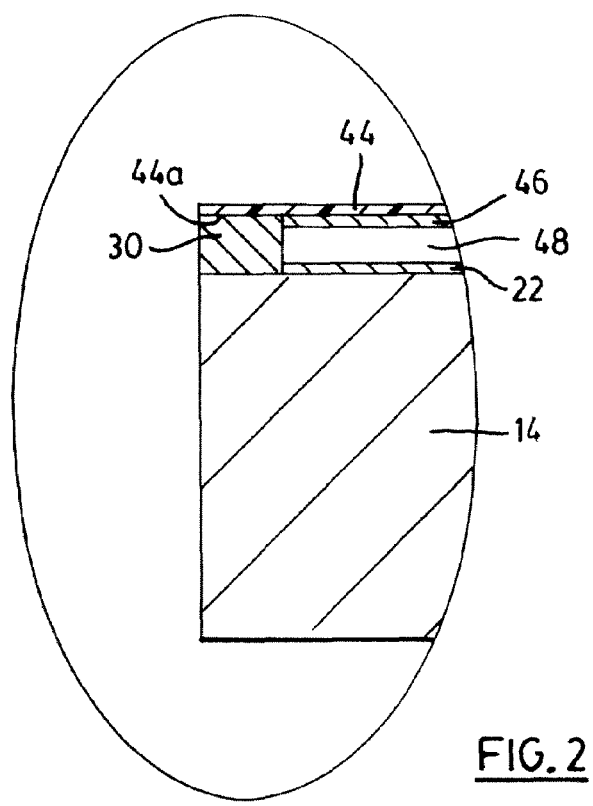
FIG. 2 is an enlarged portion of FIG. 1.

Turning now to FIGS. 1 and 2, a tensioned touch panel is shown and is generally identified by reference numeral 10. Touch panel 10 in this embodiment is generally rectangular and includes a support structure 12. Support structure 12 comprises a substrate 14 having a major top surface 16, a major bottom surface 18 and sides 20 bridging the top and bottom surfaces. The substrate 14 is formed of a rigid stable material such as for example aluminum or other suitable rigid material. A conductive carbon resistive layer 22 is bonded to the top surface 16 of the substrate 14 via an adhesive. A peripheral insulating spacer rail 30 is disposed on the top surface 16 of the substrate 14. The insulating spacer rail 30 is formed of electrically insulating material such as for example rigid polyvinyl chloride (RPVC), acrylonitrile butadiene styrene (ABS), acrylic, fiberglass reinforced plastic (FRP) or coated aluminum and is bonded to the substrate 14 via an adhesive.

A flexible, elastic conductive membrane 40 under tension overlies the support structure 12 and is secured to the insulating spacer rail 30 by a fast drying adhesive such as for example, ultraviolet curing or cyanoacrylate (CA) adhesive. The conductive membrane 40 is layered and includes an upper flexible, low creep film 44 such as for example polyethylene terephthalate (PET) and a lower conductive carbon resistive layer 46 bonded to the film 44 by adhesive. The conductive resistive layer 46 overlies the film 44 in the region corresponding to the active area of the tensioned touch panel 10. Thus, a peripheral region 44a of the film is free of the conductive resistive layer 46 allowing the film 44 to be adhered directly to the insulating spacer rail 30.

The tension applied to the conductive membrane 40 maintains separation between the conductive membrane 40 and the conductive resistive layer 22 on the top surface 16 of the substrate to define an air gap 48. In particular, the tension applied to the conductive membrane 40 before being bonded to the insulating spacer rail 30 is selected to ensure that the air gap 48 is maintained over a significant length of time and over a variety of environmental conditions without significantly increasing the activation force required to bring the conductive resistive layers 22 and 46 into electrical contact in response to a contact made on the tensioned touch panel 10. In this manner, slack does not develop in the conductive membrane 40 making the tensioned touch panel 10 robust.

The tensioned touch panel 10 operates in a manner similar to conventional touch panels. When a pointer is used to contact the tensioned conductive membrane 40 with sufficient activation force, the conductive resistive layer 46 is brought into contact with the conductive resistive layer 22 at the contact location. Voltage changes induced by the electrical contact between the conductive resistive layers 22 and 46 are sensed allowing the position of the pointer contact to be determined.

Figure 3:
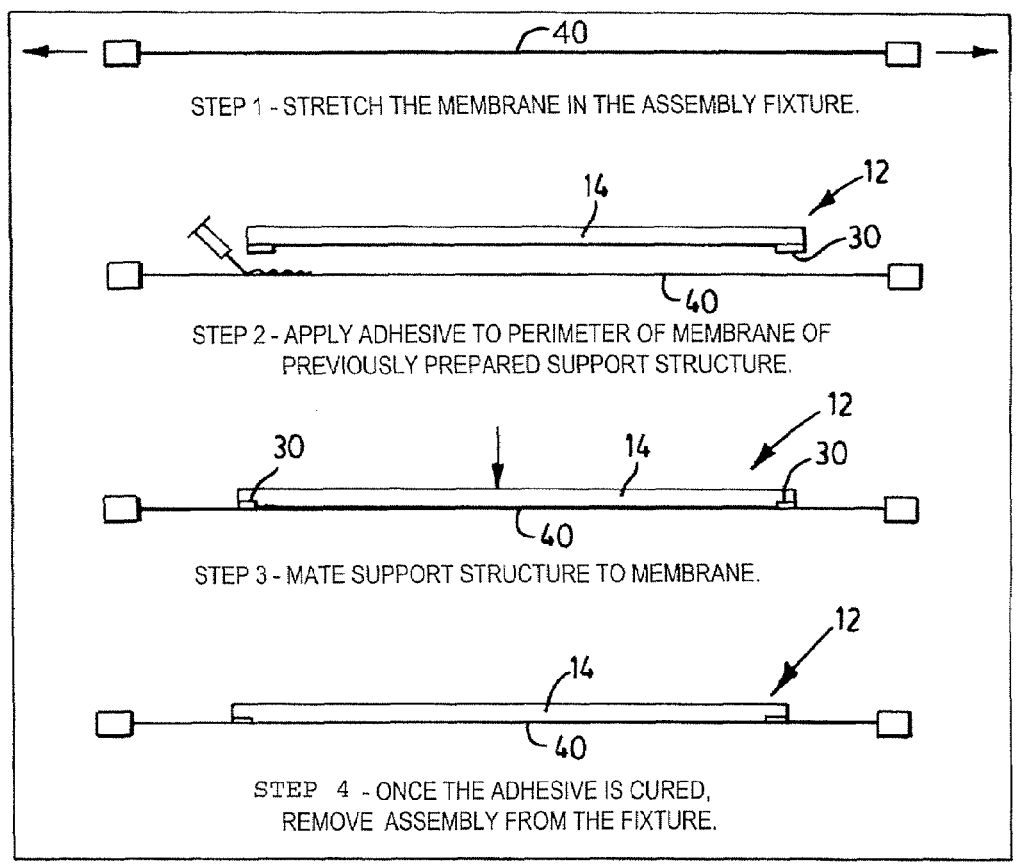
FIG. 3 shows steps performed during assembly of the tensioned touch panel of FIG. 1.

Turning to FIG. 3, the steps performed during assembly of the tensioned touch panel 10 are illustrated. The conductive membrane 40 is initially placed in an assembly fixture and is stretched in both its lengthwise and widthwise directions to place the conductive membrane 40 under tension. During stretching of the conductive membrane 40, the conductive membrane 40 is subjected to stress generally in the range of from about 1000 to 1500 pounds per square inch (psi). It has been found that this pretensioning of the conductive membrane 40 is sufficient to ensure effective operation of the tensioned touch panel 10 over a variety of environmental conditions while maintaining the activation force required to bring the conductive resistive layers 22 and 46 into electrical contact at user acceptable levels. With the conductive membrane 40 under the desired amount of tension, adhesive is placed on the peripheral region 44a of the film 44 that is free of the conductive resistive layer 46 in a pattern corresponding to the insulating spacer rail 30. Alternatively the adhesive may be placed on the insulating spacer rail 30 or on both the peripheral region 44a of the film 44 and the insulating spacer rail 30. The support structure 12 is then brought into contact with the tensioned conductive member 40 to enable a secure bond to be formed between the insulating spacer rail 30 and the tensioned conductive membrane 40. Once the adhesive cures, the conductive membrane 40 is released from the assembly fixture. Excess length of conductive membrane 40 extending beyond the insulating spacer rail 30 is removed.

As mentioned above, the tension applied to the conductive membrane 40 is selected to inhibit slack from developing in the conductive membrane by using the conductive membrane 40 itself as the means of maintaining tension. The end result is a highly reliable, robust touch panel 10 that can be easily manufactured in a low cost manner. In particular, the tension applied to the conductive membrane 40 prior to attachment to the insulating spacer rail 30 is selected to compensate for the coefficient of thermal expansion (CTE) and the coefficient of hydroscopic or hygroscopic expansion (CHE) of the conductive membrane 40 without exceeding the yield point of the conductive membrane 40 and while maintaining the activation force at user acceptable levels. By tensioning the conductive membrane 40 in this manner, the conductive membrane 40 remains wrinkle free throughout a wide range of temperature and humidity conditions while ensuring that an adequate, but not excessive, activation force is required to bring the conductive resistive layers 22 and 46 into contact in response to a contact made on the tensioned touch panel 10. The tension of the conductive membrane 40 simply reduces or increases depending on the temperature and humidity conditions while remaining wrinkle free.

A number of tests were performed on the conductive membrane 40 to ensure its suitability. During testing, the effect of the conductive resistive layer 46 on the film 44 was assumed to be negligible to the overall characteristics of the conductive membrane 40 since the conductive resistive layer 46 and bonding adhesive are both very thin and pliable as compared to the film 44. It was also assumed that the conductive membrane 40 behaves in a linear fashion with respect to CTE and CHE and that the activation force is a linear function of tension applied to the conductive membrane 40. Creep of the conductive membrane 40 was not considered to be a critical factor at the level of tension applied to the conducive membrane 40 during assembly of the touch panel 10. The conductive membrane 40 was also assumed to behave the same in both the lengthwise and widthwise directions.

Table 1 below shows the amount of elongation of a sample length of the conductive membrane 40 for various stresses applied to the conductive membrane sample.

TABLE 1

| Cross sectional area of sample | 0.14125 | Inches^2 |
| Sample length | 41.375 | Inches |

| Force (lbs) | Sample elongation (inches) | stress (psi) | % elongation |
| --- | --- | --- | --- |

TABLE 1-continued

| 0.0 | 0 | 0 | 0.00000 |
| 11.8 | 0.004 | 84 | 0.00967 |
| 16.0 | 0.008 | 113 | 0.01934 |
| 22.0 | 0.011 | 156 | 0.02659 |
| 32.4 | 0.016 | 229 | 0.03867 |
| 50.4 | 0.021 | 357 | 0.05076 |
| 73.0 | 0.033 | 517 | 0.07976 |
| 86.0 | 0.036 | 609 | 0.08701 |
| 100.8 | 0.045 | 714 | 0.10876 |
| 119.4 | 0.052 | 845 | 0.12568 |
| 136.0 | 0.06 | 963 | 0.14502 |
| 155.8 | 0.067 | 1103 | 0.16193 |
| 169.5 | 0.072 | 1200 | 0.17402 |
| 178.6 | 0.076 | 1264 | 0.18369 |
| 187.0 | 0.078 | 1324 | 0.18852 |
| 189.0 | 0.079 | 1338 | 0.19094 |
| 199.0 | 0.086 | 1409 | 0.20785 |

Figure 4:
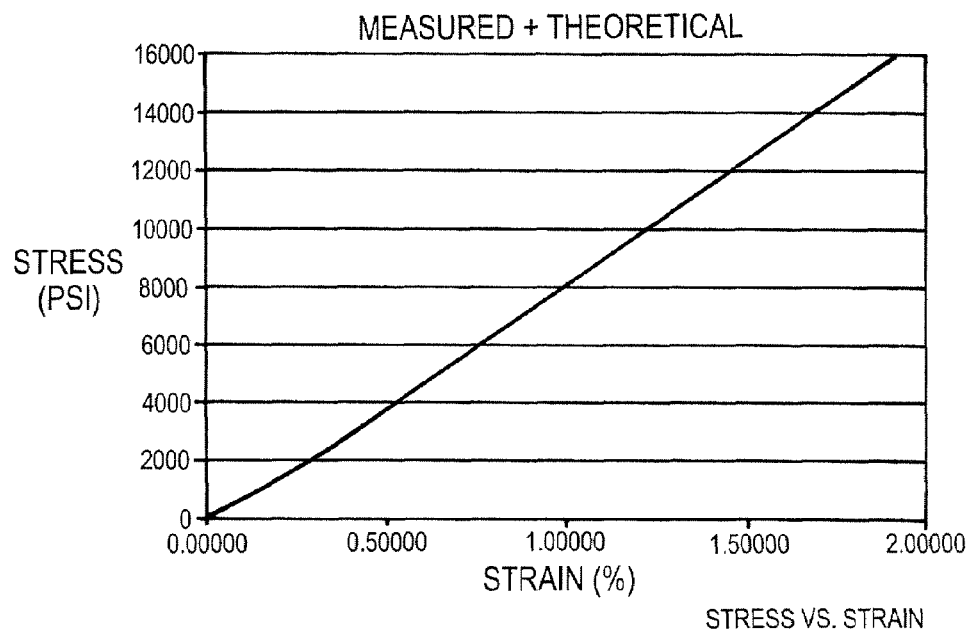
FIG. 4 is a graph showing the stress versus strain characteristics of a sample length of a conductive membrane and the theoretical stress versus strain characteristics of the conductive membrane film.

FIG. 4 is a graph showing the stress versus strain data of Table 1 together with the theoretical stress versus strain characteristics of the film 44. As will be appreciated, the behaviour of the conductive membrane 40 corresponds very well with the theoretical stress versus strain data.

The relative change in dimension between the conductive membrane 40 and the support structure 12 at a variety of environmental conditions were calculated for a tensioned touch panel 10 having an active contact area 60 inches in length and 48 inches in width. For the purpose of these calculation, the following assumptions were made:

| Conductive membrane CTE: | 0.000017 in/in/° C. |
| Conductive membrane CHE: | 0.00006 in/in/% RH |
| Support structure CTE: | 0.0000237 in/in/° C. |
| Temperature during assembly: | 21° C. |
| Humidity during assembly: | 44% |

Based on the above assumptions and looking at the longest dimension of the conductive membrane 40 where changes are greater than in the shorter dimension, the change in the size of the conductive membrane 40 for each 1° C. increase in temperature above the assembly temperature can be calculated as follows:

0.000017"/"/°*60"*1°=0.00102"

The change in size of the support structure 12 for each 1° C. increase in temperature above the assembly temperature can be calculated as follows:

0.0000237"/"/°*60"*1°=0.00142"

The change in size of the conductive membrane 40 for each 1% increase in relative humidity (RH) above the assembly humidity can be calculated as follows:

0.000006"/"/%*60"*1%=0.00036"

The effects of the CTE and CHE are cumulative for the conductive membrane 40, so for a 1° C. temperature increase and a 1% increase in relative humidity, the net change in size of the conductive membrane 40 is:

0.00102"+0.00036"=0.00138"

The relative change in size between the conductive membrane 40 and the support structure 12 for a 1° C. temperature increase and a 1% increase in relative humidity above the assembly conditions is therefore:

0.00138"−0.00142"=−0.00004"

The negative number indicates that the conductive membrane 40 grew less than the support structure 12. Since the conductive membrane 40 is rigidly and permanently bonded to the support structure 12, the conductive membrane 40 was stretched by the support structure 12 an amount equal to 0.00004".

An interactive analysis of the effects of temperature and humidity was performed using the above calculations to allow the changes in size of the conductive membrane to be calculated over a variety of environmental conditions differing from assembly conditions. For example, consider the following assembly and in service conditions where the in service conditions represent a typical office environment:
Assembly conditions: 20° C.@40% RH
In service conditions: 23° C.@60% RH In these in service conditions, the size of the conductive membrane 40 would increase by 0.006".

Consider more severe in service conditions that may represent a shipping environment:
Assembly conditions: 20° C.@35% RH
In service conditions: 50° C.@95% RH In these in service conditions, the size of the conductive membrane 40 would increase by 0.009".

Consider opposite end extreme in service conditions that may also represent a shipping environment:
Assembly conditions: 20° C.@35% RH
In service conditions: −40° C.@15% RH In these in service conditions, the size of the conductive membrane would increase by 0.016".

During assembly of the touch panel 10, the conductive membrane 40 is stretched by more than the above calculated amounts prior to being attached to the insulating spacer rail 30 of the support structure 12. As a result, changes in environmental conditions causing the conductive membrane 40 to expand do not create slack in the conductive membrane 40. Rather these environmental changes affect the tension, or stress in the conductive membrane 40 and therefore, simply alter the activation force. Since the activation force generated by a certain strain is known, the activation force can be plotted as a line as shown in FIG. 5.

Figure 5:
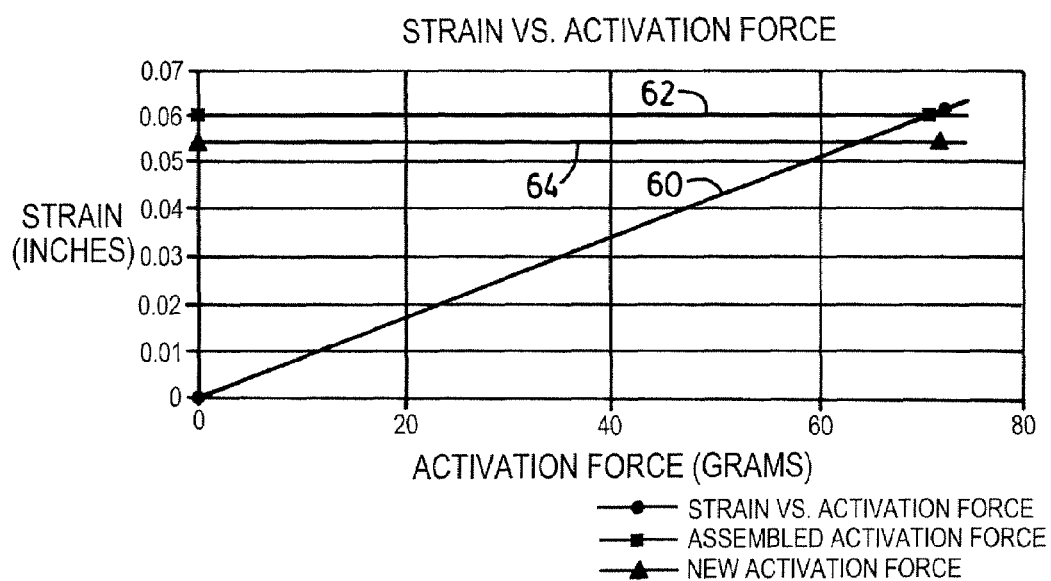
FIG. 5 is a graph showing the theoretical strain versus activation force characteristics of the conductive membrane.

Line 60 in the graph of FIG. 5 shows the theoretical relationship between strain of the conductive membrane 40 and the resulting activation force. The intersection point of line 62 and line 60 represents the activation force required to bring the conductive resistive layers 22 and 46 into electrical contact at assembly conditions of 21° C.@44% RH. The intersection point of line 64 and line 60 represents the activation force required to bring the conductive resistive layers 22 an 46 into electrical contact at environmental conditions of 40° C.@85% RH. The difference along the x-axis between the two intersection points represents the resulting change in activation force. In the above example, there is a decrease in activation force equal to about 6 or 7 grams.

Figure 6:
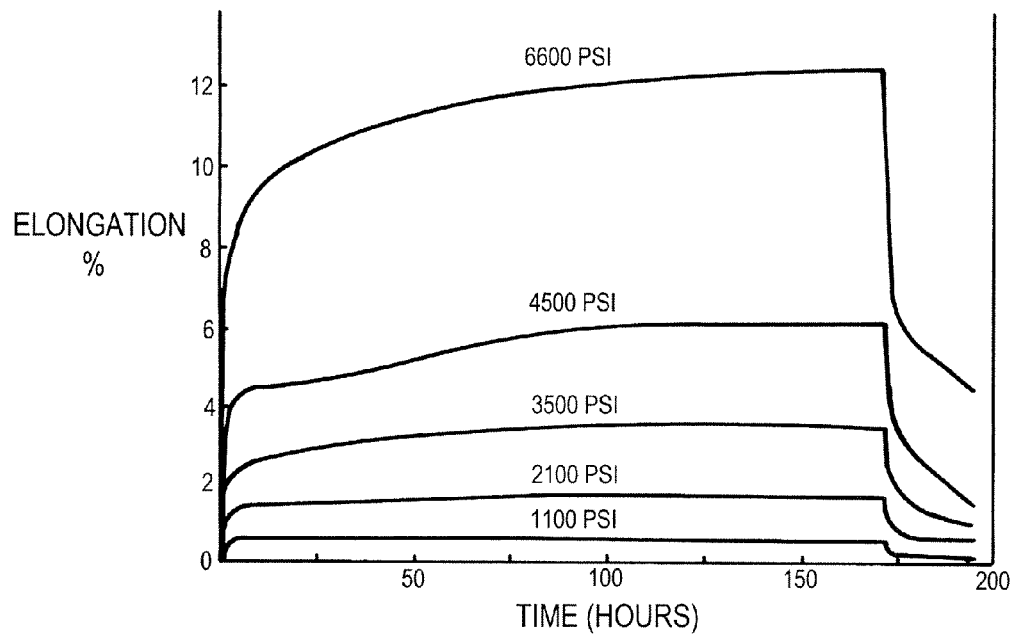
FIG. 6 is a graph showing the creep characteristics of the conductive membrane.

Creep of the conductive membrane 40 after assembly of the touch panel 10 is also of concern. If the conductive membrane 40 were to creep significantly after assembly of the touch panel 10, the activation force would drop gradually as the internal stress of the conductive membrane 40 relaxed. Creep data for the film 44 is shown in FIG. 6. The graph depicts creep as the change in elongation over time at a fixed stress. The flatter the line, the less creep exhibited by the film 44. As can be seen, creep is very low at the tension used to pretension conductive membrane 40 during assembly. The line is very flat at stresses in the 1000 to 1500 psi range.

Figure 7:
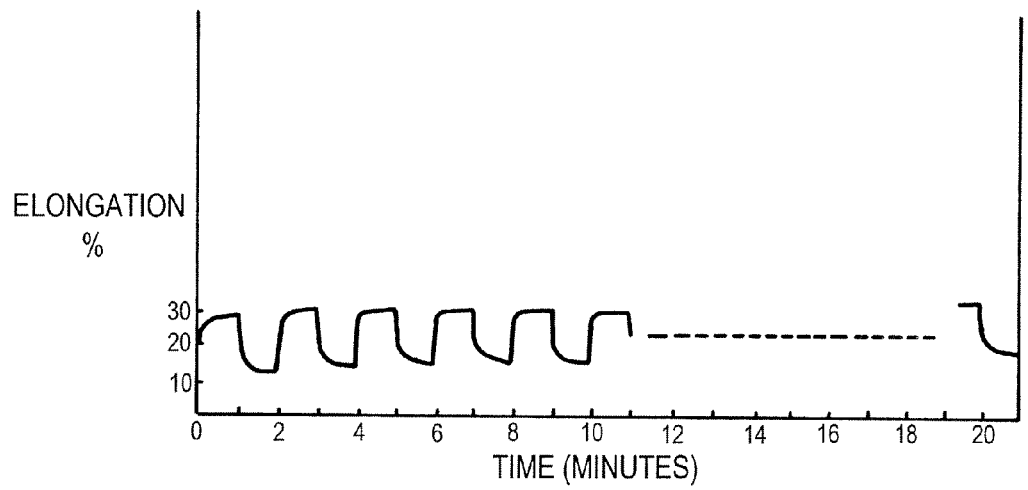
FIG. 7 is a graph showing cyclical elongation versus time characteristics of the conductive membrane film when subjected to alternating tensions of 8500 psi and zero psi respectively.

The effect of cyclical, or alternating stresses is also of concern in that the touch panel 10 may encounter many changes in environmental conditions during shipping. FIG. 7 shows data for the film 44 when the film is subjected to alternating tensions of 8500 psi and zero psi respectively. As can be seen, the film 44 exhibits a slight creep under these conditions as the bottom of each cycle is slightly higher than the previous cycle. Since the strain applied to the conductive membrane 40 during assembly of the touch panel 10 and over a variety of environmental conditions is significantly less than 8500 psi, it is believed that the effect of cyclical, or alternating stresses will be negligile.

Figure 8:
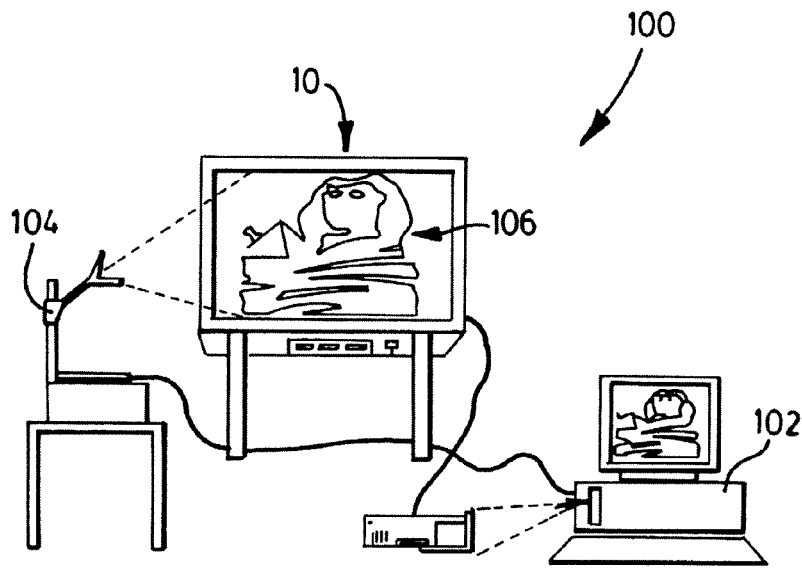
FIG. 8 is a front plan view of the tensioned touch panel of FIG. 1 in an interactive display system.

FIG. 8 shows the tensioned touch panel 10 in an interactive touch system 100 of the type disclosed in U.S. Pat. No. 5,448,263 to Martin, the content of which is incorporated herein by reference. As can be seen, the tensioned touch panel 10 is coupled to a computer 102. Computer 102 provides image data to a projector 104 which in turn projects an image 106 on the touch panel 10. Sensed pointer contacts on the touch panel 10 that are sufficient to bring the conductive resistive layers 22 and 46 into electrical contact are conveyed to the computer 102, which in turn updates the image data conveyed to the projector 104 so that the image 106 projected on the touch panel 10 reflects pointer contacts. The touch panel 10, computer 102 and projector 104 thus form a closed loop. Alternatively, the tensioned touch panel 10 may be used in conjunction with a rear projection system.

Figure 9:
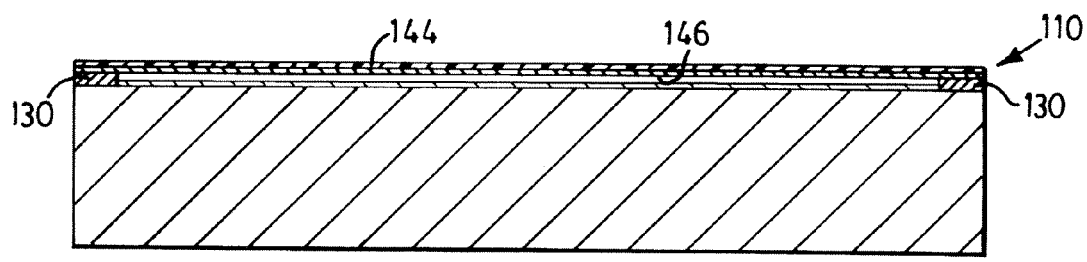
FIG. 9 is a side cross-sectional view of another embodiment of a tensioned touch panel.

FIG. 9 shows another embodiment of a tensioned touch panel 110 similar to that of FIG. 1. In this embodiment, the conductive resistive layer 146 adhered to the film 144 overlies the entire surface of the film 144 that faces the support structure 12 thereby eliminating the peripheral margin 44a.

Figure 10:
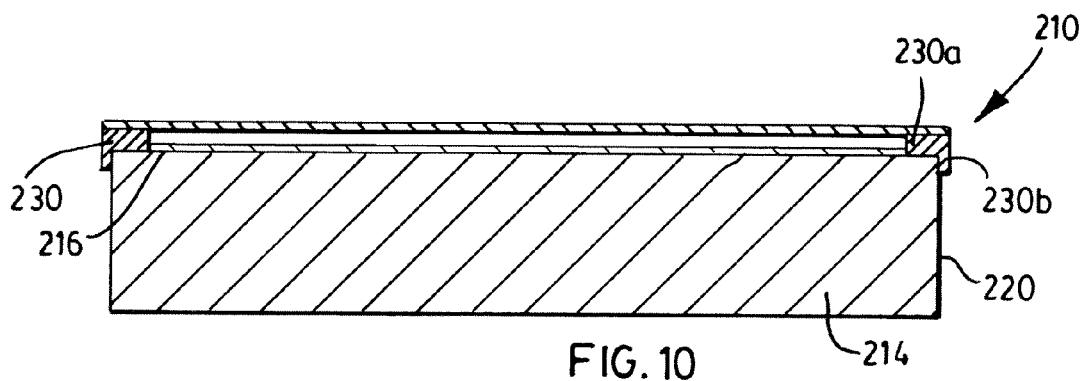
FIG. 10 is a side cross-sectional view of yet another embodiment of a tensioned touch panel.

FIG. 10 shows yet another embodiment of a tensioned touch panel 210. In this embodiment, the insulating spacer rail 230 is generally L-shaped in section. One arm 230a of the insulating spacer rail 230 overlies the periphery of the top surface 216 of the substrate 214. The other arm 230b of the insulating spacer rail 230 abuts the sides 220 of the substrate 214.

Figure 11:
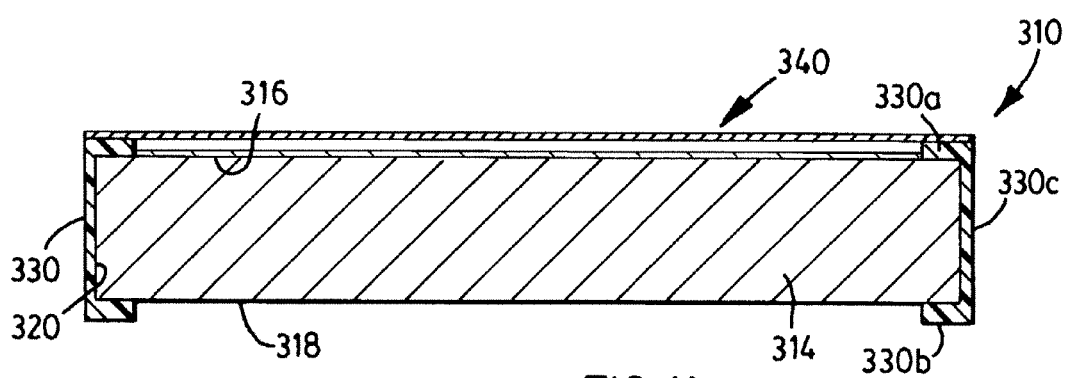
FIG. 11 is a side cross-sectional view of yet another embodiment of a tensioned touch panel.

FIG. 11 shows yet another embodiment of a tensioned touch panel 310. In this embodiment the insulating spacer rail 330 is C-shaped in section and completely surrounds the sides 320 of the substrate 314. The upper arm 330a of the insulating spacer rail 330 overlies the periphery of the top surface 316 of the substrate 314. The lower arm 330b of the insulating spacer rail 330 overlies the periphery of the bottom surface 318 of the substrate 314. The bight 330c of the insulating spacer rail 330 abuts the sides 320 of the substrate 314. The conductive membrane 340 is similar to that shown in FIG. 1 and is bonded to the top surface of the upper arm 330a.

Figure 12:
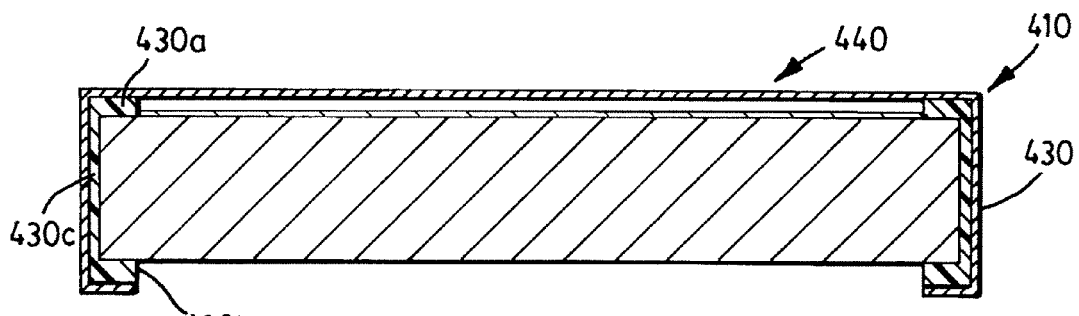
FIG. 12 is a side cross-sectional view of still yet another embodiment of a tensioned touch panel.
Figure 13:
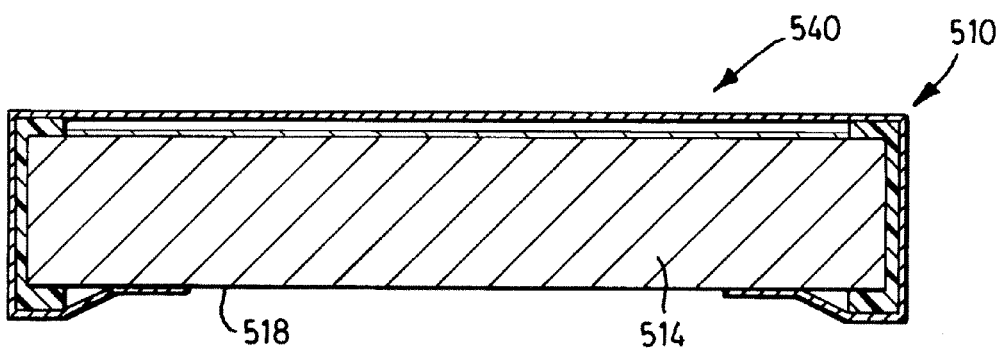
FIG. 13 is a side cross-sectional view of still yet another embodiment of a tensioned touch panel.

FIGS. 12 and 13 show still yet further embodiments of tensioned touch panels 410 and 510 respectively similar to that of FIG. 11. In FIG. 12, the conductive membrane 440 overlies the entire outer surface of the insulating spacer rail 430 and is bonded to the upper and lower arms 430a and 430b as well as the bight 430c of the insulating spacer rail 430. In the embodiment of FIG. 13, the conductive membrane 540 also overlies the entire outer surface of the insulating spacer rail 530 but extends beyond the lower arm 530b of the insulating spacer rail 530 and is bonded to the bottom surface 518 of the substrate 514.

Although the conductive membranes illustrated in FIGS. 10 to 13 show the conductive resistive layer covering the entire surface of the film that faces the support structure, conductive membranes of the form shown in FIG. 1 can of course be used.

Although a number of embodiments of the tensioned touch panel have been described and illustrated, those of skill in the art will appreciate that other variations and modifications may be made without departing from the spirit and scope thereof as defined by the appended claims. For example, the support structure need not be rectangular. The present method allows tensioned touch panels of virtually any shape to be constructed. Ultraviolet and CA adhesives were selected to secure the conductive membrane to the support structure due to their fast cure times. Other suitable adhesives can of course also be used. The peripheral insulating spacer rails need not to be adhered to the support structure. Other suitable fastening means may of course be used to secure the insulating spacer rails to the support structure.

What is claimed is:

1. A tensioned touch panel comprising:
a support structure comprising a substrate having a generally planar conductive surface disposed thereon and an insulating spacer generally about the periphery of said substrate; and
a flexible, elastic, conductive membrane overlying said support structure and secured thereto, said spacer separating said conductive membrane and said conductive surface thereby to define an air gap therebetween, said conductive membrane being stressed to a level of pretension prior to being secured to said support structure that is selected to maintain the separation between the conductive membrane and the conductive surface and inhibit slack from developing in said conductive membrane over time and as a result of changes in environmental conditions, after said conductive membrane has been secured to said support structure.

2. A tensioned touch panel according to claim 1 wherein said conductive membrane is affixed to said support structure with an adhesive.

3. A tensioned touch panel according to claim 2 wherein said adhesive is an ultraviolet curing adhesive.

4. A tensioned touch panel according to claim 2 wherein said adhesive is a cyanoacrylate adhesive.

5. A tensioned touch panel according to claim 2 wherein said spacer is a generally continuous rail about the periphery of said substrate.

6. A tensioned touch panel according to claim 5 wherein said rail overlies a peripheral region of said substrate surrounding said conductive surface, said conductive membrane being adhered directly to said rail.

7. A tensioned touch panel according to claim 5 wherein said conductive membrane includes a film and a conductive layer on said film, said conductive layer facing said conductive surface.

8. A tensioned touch panel according to claim 7 wherein said conductive layer covers a portion of a major surface of said film defining a peripheral margin, said peripheral margin corresponding generally in shape to said spacer.

9. A tensioned touch panel according to claim 7 wherein said conductive layer covers the entirety of a major surface of said film.

10. A tensioned touch panel comprising:
a support structure having a conductive surface disposed thereon; and
a flexible, elastic, conductive membrane overlying said conductive surface in spaced apart relation, said conductive membrane being permanently secured to said support structure, said conductive membrane being stressed to a level of pretension prior to being secured to said support structure, the level of pretension being selected to maintain separation between the conductive membrane and the conductive surface and inhibit slack from developing in said conductive membrane over time and over a variety of environmental conditions, after said conductive membrane has been secured to said support structure.

11. A tensioned touch panel according to claim 10 wherein said conductive membrane is affixed to said support structure with an adhesive.

12. A tensioned touch panel according to claim 11 wherein said adhesive is an ultraviolet curing adhesive.

13. A tensioned touch panel according to claim 11 wherein said adhesive is a cyanoacrylate adhesive.

14. A tensioned touch panel according to claim 11 wherein said conductive membrane is stressed to a level of pretension selected to compensate for the coefficient of thermal and hydroscopic or hygroscopic expansion of said conductive membrane over a variety of temperature and humidity conditions.

15. A tensioned touch panel according to claim 14 wherein said level of pretension is below the yield point of said conductive membrane and below a level at which said conductive membrane exhibits significant creep.

16. A tensioned touch panel according to claim 15 wherein said level of pretension is in the range of from about 1000 to 1500 psi.

17. A tensioned touch panel comprising:
a support structure comprising a substrate having a generally planar conductive surface disposed thereon and an insulating spacer generally about the periphery of said substrate; and
a flexible, elastic, conductive membrane overlying said support structure and secured thereto, said spacer separating said conductive membrane and said conductive surface thereby to define an air gap therebetween, said conductive membrane being stressed to a level of pretension prior to being secured to said support structure, said level of pretension being selected to maintain the separation between the conductive membrane and the conductive surface and compensate for the coefficient of thermal and hydroscopic or hygroscopic expansion of said conductive membrane over a variety of temperature and humidity conditions, after said conductive membrane has been secured to said support structure.

18. A tensioned touch panel according to claim 17 wherein said level of pretension is below the yield point of said conductive membrane and below a level at which said conductive membrane exhibits significant creep.

19. A tensioned touch panel according to claim 18 wherein said level of pretension is in the range of from about 1000 to 1500 psi.

20. A tensioned touch panel according to claim 18 wherein said conductive membrane is affixed to said support structure with an adhesive.

21. A tensioned touch panel according to claim 20 wherein said adhesive is an ultraviolet curing adhesive.

22. A tensioned touch panel according to claim 20 wherein said adhesive is a cyanoacrylate adhesive.

23. A tensioned touch panel according to claim 20 wherein said spacer is a generally continuous rail about the periphery of said substrate.

24. A tensioned touch panel according to claim 23 wherein said rail overlies a peripheral region of said substrate surrounding said conductive surface, said conductive membrane being adhered directly to said rail.

25. A tensioned touch panel according to claim 23 wherein said rail is generally L-shaped in side section and includes one arm portion overlying said peripheral region and another arm portion abutting the sides of said substrate, said conductive member being adhered directly to said rail.

26. A tensioned touch panel according to claim 23 wherein said rail is generally C-shaped in side section and includes one arm portion overlying said peripheral region, another arm portion overlying an opposed surface of said substrate and a bight joining said arm portions and abutting the sides of said substrate, said conductive member being adhered to at least one of said rail and opposed surface.

27. A tensioned touch panel according to claim 26 wherein said conductive membrane is affixed to said rail with an adhesive.

28. A tensioned touch panel according to claim 26 wherein said conductive membrane is affixed to said opposed surface with an adhesive.

29. A tensioned touch panel according to claim 18 wherein said conductive membrane includes a film and a conductive layer on said film, said conductive layer facing said conductive surface.

30. A tensioned touch panel according to claim 29 wherein said conductive layer covers a portion of a major surface of said film defining a peripheral margin, said peripheral margin corresponding generally in shape to said spacer.

31. A tensioned touch panel according to claim 29 wherein said conductive layer covers the entirety of a major surface of said film.

* * * * *